(12) United States Patent
Park et al.

(10) Patent No.: US 10,506,066 B2
(45) Date of Patent: Dec. 10, 2019

(54) APPARATUS AND METHOD OF PROVIDING VIRTUALIZATION SERVICE PLATFORM

(71) Applicant: Alticast Corporation, Seoul (KR)

(72) Inventors: Hwan Hyo Park, Seoul (KR); Dong Won Namgung, Yongin-si (KR); Hae Chul Lee, Seoul (KR); Na Kyoung Seo, Seoul (KR)

(73) Assignee: Byclip Co., Ltd., Seoul (KR)

( * ) Notice: Subject to any disclaimer, the term of this patent is extended or adjusted under 35 U.S.C. 154(b) by 285 days.

(21) Appl. No.: 15/294,028

(22) Filed: Oct. 14, 2016

(65) Prior Publication Data

US 2017/0111470 A1   Apr. 20, 2017

(30) Foreign Application Priority Data

Oct. 16, 2015   (KR) .......................... 10-2015-0144695

(51) Int. Cl.
*H04L 29/08* (2006.01)
*H04W 4/80* (2018.01)
*H04W 4/70* (2018.01)

(52) U.S. Cl.
CPC ............ *H04L 67/303* (2013.01); *H04L 67/02* (2013.01); *H04L 67/10* (2013.01); *H04L 67/12* (2013.01); *H04W 4/70* (2018.02); *H04W 4/80* (2018.02)

(58) Field of Classification Search
None
See application file for complete search history.

(56) References Cited

U.S. PATENT DOCUMENTS

| | | | |
|---|---|---|---|
| 2011/0258024 A1* | 10/2011 | Prince | G06Q 30/02 705/14.14 |
| 2016/0065653 A1* | 3/2016 | Chen | H04L 67/10 715/735 |
| 2016/0291826 A1* | 10/2016 | Verzano | H04L 41/145 |
| 2016/0357521 A1* | 12/2016 | Zhang | G06F 8/34 |
| 2016/0357524 A1* | 12/2016 | Maluf | G06F 8/34 |
| 2017/0289176 A1* | 10/2017 | Chen | H04L 63/1408 |
| 2017/0300598 A1* | 10/2017 | Akavia | G06Q 50/04 |

FOREIGN PATENT DOCUMENTS

KR   2014-0076948 A   6/2014
KR   10-1465522 B1   11/2014

* cited by examiner

*Primary Examiner* — Philip J Chea
*Assistant Examiner* — Hassan A Khan
(74) *Attorney, Agent, or Firm* — Harness, Dickey & Pierce, P.L.C.

(57) ABSTRACT

Disclosed is a technical idea of supporting such that a simulation service corresponding to an internet of things terminal is provided through a user terminal. An apparatus for providing a virtualization service platform according to an embodiment of the present invention includes a storage unit for storing a list of IoT terminals; a processing unit for identifying an IoT terminal selected from the list of the stored IoT terminals; and a control unit for requesting that a cloud server provides a simulation service corresponding to the identified IoT terminal, wherein the cloud server provides, as a response to the request, at least one virtualization object corresponding to the identified IoT terminal to a user terminal.

8 Claims, 6 Drawing Sheets

APPARATUS AND METHOD OF PROVIDING VIRTUALIZATION SERVICE PLATFORM

CROSS-REFERENCE TO RELATED APPLICATION

This application claims priority to and the benefit of Korean Patent Application No. 2015-0144695, filed on Oct. 16, 2015, the disclosure of which is incorporated herein by reference in its entirety.

BACKGROUND OF THE INVENTION

1. Field of the Invention

The present invention relates to a technical idea of supporting to provide a simulation service corresponding to an internet of things terminal through a user terminal.

2. Description of the Related Art

Internet of Things (IoT) is a technology of connecting objects via a network and thus sharing information thereon, and is applied in various fields such as healthcare, remote metering, smart home, smart cars, and the like as well as home appliances and electronic equipment. Such IoT may be considered an advanced form of conventional Ubiquitous Sensor Network (USN) or Machine-to-Machine (M2M).

While a main objective of the conventional M2M is to allow communication between a communication device (end-device) and humans, IoT allows communication between more various ubiquitous objects, such as telephones, books, and thermometers, and humans. That is, IoT may be interpreted as an object-space network cooperatively forming intelligent relationships, such as sensing, networking, and information processing, among three separated environmental factors, i.e., a human, a thing, and a service, without explicit human intervention.

Recently, various concepts, such as Web of Things (WoT) or Web of Objects (WoO), along with IoT and various technologies have been researched and developed.

According to such technical trends and user needs, IoT terminals with various shapes are being developed.

RELATED ART DOCUMENTS

Patent Documents

Korean Patent Application Publication No. 2014-0076948 (Jun. 23, 2014), "APPARATUS AND METHOD FOR EXCHANGING DATA MESSAGE IN INTERNET-OF-THINGS"

Korean Patent No. 1465522 (Nov. 20, 2014), "METHOD AND SYSTEM FOR EXECUTING IOT SERVICE WITH SHORTRANGE COMMUNICATION TAG"

SUMMARY OF THE INVENTION

Therefore, the present invention has been made in view of the above problems, and it is an object of the present invention to allow a user to indirectly experience main functions of an IoT terminal regardless of launching of a complete product or purchase of the product and thus induce purchase, in accordance with embodiments of the present disclosure.

It is another objective of the present invention to determine the use of a purchased IoT terminal by experiencing the IoT terminal through simulation or to easily learn a use method thereof, regardless of installation, in accordance with embodiments of the present disclosure.

In accordance with the present invention, the above and other objects can be accomplished by the provision of An apparatus for providing a virtualization service platform, including a storage unit for storing a list of IoT terminals; a processing unit for identifying an IoT terminal selected from the list of the stored IoT terminals; and a control unit for requesting that a cloud server provides a simulation service corresponding to the identified IoT terminal, wherein the cloud server provides, as a response to the request, at least one virtualization object corresponding to the identified IoT terminal to a user terminal.

The processing unit according to an embodiment of the present disclosure may update the list of the IoT terminals.

The processing unit according to an embodiment of the present disclosure may recognize an installed IoT terminal and the list may be updated with the recognized IoT terminal.

The processing unit according to an embodiment of the present disclosure may download identification information of the IoT terminal from an outside and thus may update the IoT terminal list.

The cloud server according to an embodiment of the present disclosure may confirm instances included in the at least one virtualization object, may collect content corresponding to the confirmed instances, and may provide the collected content to the user terminal.

In accordance with another aspect of the present invention, there is provided an apparatus for providing a virtualization service platform including a processing unit for identifying an IoT terminal selected from a list of IoT terminals; a control unit for extracting at least one virtualization object regarding the identified IoT terminal; and a simulator for providing a simulation service to a user terminal using the extracted at least one virtualization object.

The apparatus for providing a virtualization service platform according to an embodiment of the present disclosure may further include a storage unit for recording identification information of the IoT terminal in relation to at least one virtualization object corresponding to the identification information, wherein the control unit extracts the at least one virtualization object using the identification information of the identified IoT terminal.

The processing unit according to an embodiment of the present disclosure may recognize an installed IoT terminal and the list may be updated with the recognized IoT terminal.

The processing unit according to an embodiment of the present disclosure may download identification information of the IoT terminal from an outside and thus may update the IoT terminal list.

The simulator according to an embodiment of the present disclosure may confirm instances included in the extracted at least one virtualization object, may collect content corresponding to the confirmed instances, and may provide the collected content to the user terminal.

The simulator according to an embodiment of the present disclosure may request to the user terminal such that advertising content regarding a corresponding IoT terminal are exposed during driving of the virtualization object.

The simulator according to an embodiment of the present disclosure may provide discount information related to purchase of the IoT terminal considering an exposure time of the advertising content during driving of the virtualization object.

The simulator according to an embodiment of the present disclosure may collect feedback information on a purchased IoT terminal.

The storage unit according to an embodiment of the present disclosure may store prior setting information which has been set to the at least one virtualization object by a user according to use of a simulation service, wherein the stored setting information is applied to an IoT terminal to be purchased.

The simulator according to an embodiment of the present disclosure may provide the simulation service by interworking the virtualization object with another IoT terminal.

The simulator according to an embodiment of the present disclosure may receive a selection request regarding an IoT terminal, provision of a simulation service of which is planned, from the list of the IoT terminals, may determine whether approval of an application corresponding to the received selection request has been made, and may provide the simulation service only when the application has been approved.

The processing unit according to an embodiment of the present disclosure may process a payment corresponding to the provided simulation service.

The processing unit according to an embodiment of the present disclosure may appropriate a fee considering a data communication amount between the IoT terminal and the user terminal 330 and may process such that the appropriated fee is charged a content provider.

In accordance with an aspect of the present invention, the above and other objects can be accomplished by the provision of a cloud server including a receiver for receiving a simulation service request regarding an IoT terminal selected from a list of IoT terminals list; and a simulator for extracting at least one virtualization object corresponding to the simulation service request and providing the at least one virtualization object to a user terminal.

The simulator according to an embodiment of the present disclosure may confirm instances included in the extracted at least one virtualization object, may collect content corresponding to the confirmed instances, and may provide the collected content to the user terminal.

The simulator according to an embodiment of the present disclosure may store prior setting information set on at least one virtualization object by a user according to use of a simulation service, and may be applied to an IoT terminal to be purchased.

The simulator according to an embodiment of the present disclosure may provide a simulation service by interworking the virtualization object with another IoT terminal.

The simulator according to an embodiment of the present disclosure may appropriate a fee considering a data communication amount between the IoT terminal and the user terminal and may charge a fee based on the appropriated fee.

In accordance with yet another aspect of the present invention, there is provided a method of providing a virtualization service, the method including identifying an IoT terminal, which is selected from a list of stored IoT terminals, in a processing unit; and requesting that a cloud server provides a simulation service corresponding to the identified IoT terminal, in a control unit, wherein the cloud server provides, as response to the request, at least one virtualization object corresponding to the identified IoT terminal to a user terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the embodiments of the present invention are described with reference to the accompanying drawings and the description thereof but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

Further, as used in the description of the invention and the appended claims, the singular forms "a", "an" and "the" are intended to include the plural forms as well, unless context clearly indicates otherwise.

Further, terms such as "first" and "second" are used herein merely to describe a variety of constituent elements, but the constituent elements are not limited by the terms. The terms are used only for the purpose of identifying one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
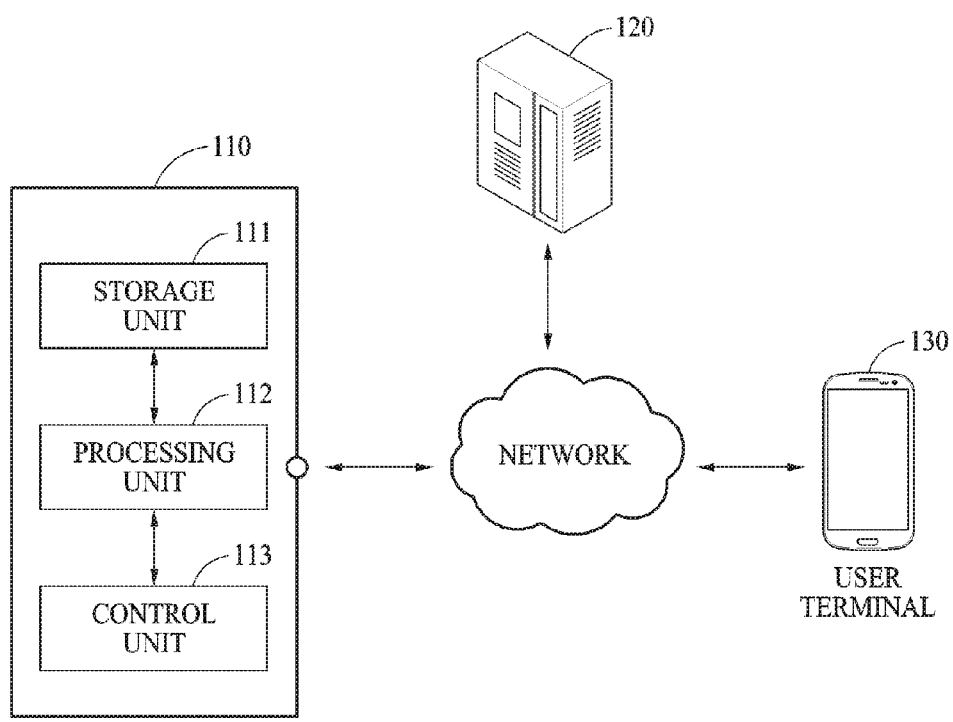
FIG. 1 illustrates an apparatus for providing a virtualization service platform to provide a service through a cloud server simulation.

FIG. 1 illustrates an apparatus for providing a virtualization service platform 110 to provide a simulation service to a user terminal 130 through a cloud server 120.

The apparatus 110 of FIG. 1 may be realized in a form of a partial hardware of a set-top box or a middleware installed in the set-top box.

The apparatus 110 according to an embodiment of the present disclosure may request to the cloud server 120 such that a specific IoT terminal, which a user selects, is simulated in the user terminal 130.

To accomplish this, the apparatus 110 according to an embodiment of the present disclosure may include a storage unit 111, a processing unit 112, and a control unit 113.

In particular, the storage unit 111 according to an embodiment of the present disclosure may store a list of IoT terminals, which may be provided through a simulation service.

For example, the list of IoT terminals includes a list displayed on the user terminal 130. A user may select a simulation-desired specific IoT terminal from the IoT terminal list displayed on the user terminal 130.

The processing unit 112 according to an embodiment of the present disclosure may identify an IoT terminal selected by a user from a stored IoT terminal list. For example, the processing unit 112 may identify a specific IoT terminal selected from the IoT terminal list by matching a selection signal corresponding to a specific IoT terminal to identification information of the IoT terminal.

The control unit 113 according to an embodiment of the present disclosure may request to the cloud server 120 such that a simulation service corresponding to the identified IoT terminal is provided.

IoT terminals included in the list may be released products or prerelease products. For example, in the case of a released product, the processing unit 112 may recognize an IoT terminal electrically connected to or installed in a set-top box and newly register the recognized IoT terminal in the list.

In the case of a product before release, the processing unit 112 may download terminal identification information on a corresponding terminal and information allowing unique identification of the terminal from the outside and register the same in the list, thereby upgrading the list.

Accordingly, the apparatus 110 may induce purchase by allowing a user to indirectly experience main functions of the IoT terminal regardless of launching of a complete product or purchase of the product.

The cloud server 120 receives a platform for providing a simulation service, etc. from a relevant server and maintains the same. In addition, the cloud server 120 responds to a request of the apparatus 110 and thus provides a simulation service to the user terminal 130.

Meanwhile, the apparatus 110 may provide a simulation service to the user terminal 130 also in the case in which a complete product is released, but purchase is not made.

For example, the apparatus 110 collects identification information related to an IoT terminal before purchase from the outside and registers the collected identification information on a list. Accordingly, a user selects a simulation-desired specific IoT terminal from the list of displayed IoT terminals. Accordingly, the processing unit 112 may identify an IoT terminal selected from the stored IoT terminal list. In addition, the control unit 113 may transmit identification information on the selected IoT terminal to the cloud server 120 and thus may request a simulation service. Accordingly, the cloud server 120 provides a simulation service to the user terminal 130 as a response to the request.

In an embodiment, the cloud server 120 may provide a simulation service by providing at least one virtualization object corresponding to an IoT terminal selected from the list by a user to the user terminal 130.

For example, the apparatus 110 may collect identification information on a purchased IoT terminal from an installation CD or a website and may register the same in the list. Accordingly, a user selects a simulation-desired specific IoT terminal from a displayed IoT terminal list. Accordingly, the processing unit 112 may identify the selected IoT terminal from the stored IoT terminal list and the control unit 113 may transmit identification information on the selected IoT terminal to the cloud server 120, thereby requesting a simulation service.

Therefore, the apparatus 110 provides an experience through a simulation regardless of installation and without confirmation of a use method, a manual, etc. of the IoT terminal through a manual or a website, whereby a user may determine the use of the IoT terminal or may easily learn a method of using the same.

Figure 2:
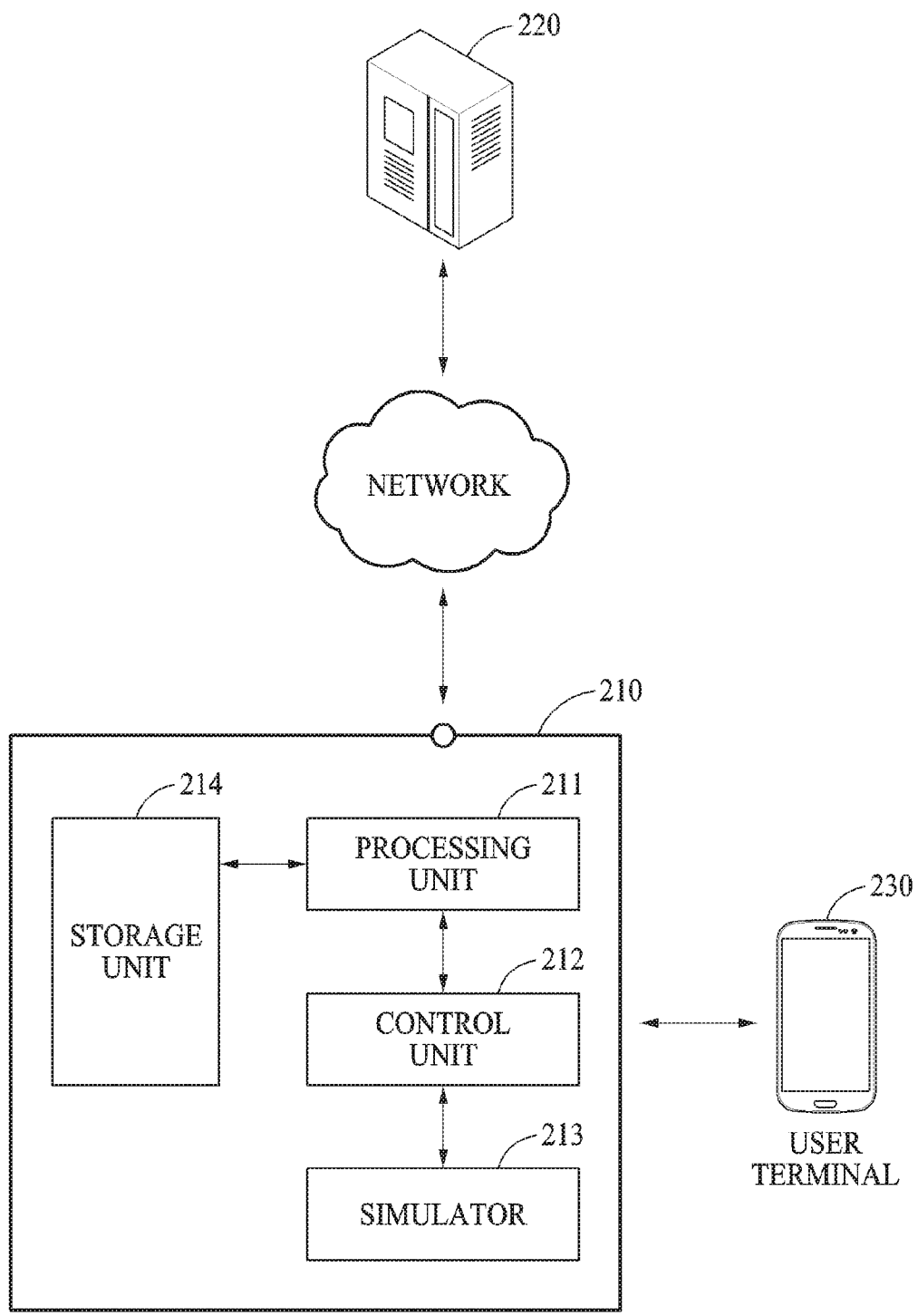
FIG. 2 illustrates an apparatus for providing a virtualization service platform to provide a simulation service.

FIG. 2 illustrates an apparatus 210 for providing a virtualization service platform to provide a simulation service.

The apparatus 210 illustrated in FIG. 2 may be realized in a form of a partial hardware of a set-top box or a middleware installed in the set-top box.

The apparatus 210 according to an embodiment of the present disclosure may provide a simulation service to a user terminal 230 such that a specific IoT terminal selected by a user is simulated. In addition, a cloud server 220 may provide content, a platform, or the like for providing a simulation service to the apparatus 210.

The apparatus 210 according to an embodiment of the present disclosure may include a processing unit 211, a control unit 212, and a simulator 213 to provide a simulation service to the user terminal 230.

The processing unit 211 according to an embodiment of the present disclosure may store a list of IoT terminals, which may be provided through a simulation service. The list of IoT terminals is displayed on the user terminal 230. A user may select a simulation-desired specific IoT terminal from the IoT terminal list displayed on the user terminal 230. The processing unit 211 according to an embodiment of the present disclosure may identify an IoT terminal selected by a user from a stored IoT terminal list. For example, the processing unit 211 may identify a specific IoT terminal selected from the IoT terminal list by matching a selection signal corresponding to a specific IoT terminal to identification information of the IoT terminal.

The control unit 212 according to an embodiment of the present disclosure may extract at least one virtualization object regarding the identified IoT terminal.

The simulator 213 according to an embodiment of the present disclosure may provide a simulation service to a user terminal using the extracted at least one virtualization object.

The apparatus 210 according to an embodiment of the present disclosure may further include a storage unit 214 for recording identification information on the IoT terminal in relation to at least one virtualization object corresponding to the identification information and maintaining the same. Accordingly, the control unit 212 extracts at least one virtualization object using the identification information of the IoT terminal.

For example, the simulator 213 may verify instances included in the extracted at least one virtualization object, collect content corresponding to the verified instances, and provide the collected content to the user terminal 230.

The storage unit 214 according to an embodiment of the present disclosure may store prior setting information which has been set to the at least one virtualization object by a user according to use of a simulation service. Accordingly, when a user purchases an IoT terminal, prior setting information set upon use of a simulation service of the IoT terminal may be applied to the IoT terminal. For example, a user may control a virtualization object corresponding to an LED lamp, which is purchasable, through a simulation service, and thus, may set an optimal LED setting value considering personal preference. Here, when the user satisfies the simulation result, a purchase can be made. In this case, the apparatus for providing a virtualization service platform records the LED setting value and, when the user purchases the LED lamp, the recorded setting value of the LED lamp may be provided to the user.

That is, the setting of the virtualization object may be reflected in the IoT terminal.

The virtualization object may implement a service supported by the IoT terminal.

More particularly, in the case of an IoT terminal related to a smart car, a virtualization object related to the smart car may be interpreted as an assembly of functions for controlling the smart car or realizing feedback corresponding to the control.

The virtualization object may be simulated through various instances including particular data according to driving of the IoT terminal.

In another embodiment, when the IoT terminal is a sensor for smart metering, a virtualization object virtually provides functions related to sensing. In addition, instances corresponding to the virtualization object may be interpreted as particular sensing values or feedback values, etc. required for realization of various functions.

The instances may be prior data generated according to real operation of the IoT terminal, may be stored and maintained in the cloud server 220, and may be provided as needed.

As described in the embodiment of FIG. 1, IoT terminals included in the list may be released products or prerelease products. For example, in the case of a released product, the processing unit 211 may recognize an IoT terminal electrically connected to or installed in a set-top box and newly register the recognized IoT terminal in the list. In addition, in the case of a product before release, the processing unit 211 may download terminal identification information on a corresponding terminal and information allowing unique identification of the terminal from the outside and register the same in the list, thereby upgrade the list.

Accordingly, the apparatus 210 may induce purchase by allowing a user to indirectly experience main functions of the IoT terminal regardless of launching of a complete product or purchase of the product.

The processing unit 211 according to an embodiment of the present disclosure receives a platform or providing a simulation service, etc. from a relevant server and maintains the same. The simulator 213 responds to selection of a user and thus provides the simulation service to the user terminal 230.

Meanwhile, the apparatus 210 may provide a simulation service to the user terminal 230 also in the case in which a complete product is released, but purchase is not made.

For example, the apparatus 210 collects identification information related to an IoT terminal before purchase from the outside and registers the collected identification information on a list. In addition, the apparatus 210 may collect identification information related to a purchased IoT terminal from an enclosed installation CD or a website and register the collected identification information on a list. That is, both before or after purchase, a user may select a simulation-desired specific IoT terminal from the displayed IoT terminal list and thus request a simulation service.

Therefore, by using the apparatus 210, a user is not required to install a purchased IoT terminal and confirm a use method, a manual, etc. of the IoT terminal through a manual or a website. That is, the apparatus 210 provides an experience through a simulation and thus allows a user to determine the use of the IoT terminal or easily learn a method of using the same.

Accordingly, the apparatus 210 may induce a user using a simulation service to purchase an IoT terminal corresponding to the simulation. For example, the apparatus 210 may continuously sever advertisements for the corresponding IoT terminal during the simulation and thus naturally induce a purchase.

To accomplish this, the simulator 213 may request to the user terminal 230 such that advertising content for a corresponding IoT terminal is exposed during driving of a virtualization object and thus purchase is induced.

In another embodiment, the apparatus 210 may be utilized for purchase induction in proportion to a simulation use time, i.e., considering an exposure time of advertising content through a simulation.

To accomplish this, the simulator 213 may provide discount information to induce purchase of an IoT terminal considering an exposure time of advertising content during driving of the virtualization object.

More particularly, the apparatus 210 may provide discount coupon information on the IoT terminal considering an advertising content exposure time though a simulation. In an embodiment, the apparatus 210 may actively induce purchase by applying a different discount rate to a user using a simulation for one minute and thus being exposed to advertising content for one minute or less and a user using a simulation for 10 minutes and thus being exposed to advertising content for 10 minutes or less. Embodiments related to the purchase induction are not limited to the aforementioned embodiments and various purchase induction technologies may be applied through various embodiments.

Meanwhile, the apparatus 210 may continuously utilize experiences after purchase by a user.

That is, the apparatus 210 may collect feedback information on an IoT terminal purchased through the simulator 213.

For example, the apparatus 210 may collect feedback for an IoT terminal purchased after provision of simulation. That is, the collected feedback may be provided to continuously collect experiences after purchase and thus to be variously utilized, e.g., to be utilized for improvement of the IoT terminal or in consumer reviews, etc.

In addition, the IoT service may be constituted of a plurality of terminals.

The simulator 213 may provide a simulation service while interworking a virtualization object with another IoT terminal.

For example, the case in which the operation "driving of LED lamp" occurs in response to the operation "opening of door sensor" may be considered.

In this case, the IoT service should be realized through a first IoT terminal for controlling a locking device of the door and a second IoT terminal for controlling the lightening of the LED lamp.

Here, at least any one of the first and second IoT terminals may be realized as a virtualization object. That is, the IoT service may be realized by interworking the virtualization object with an IoT terminal.

More particularly, a situation in which a door sensor has already been installed and purchase of an LED lamp is planned may be considered. In this case, a virtualization object corresponding to the LED lamp responds when a door, at which the door sensor has been installed, is opened, whereby a corresponding virtualization object may be turned on.

On the other hand, a case in which the LED lamp has been installed and purchase of the door sensor is planned may be considered. When a virtualization object corresponding to a door sensor is connected to a corresponding service and then a user sets a virtualization object of the door sensor in an open state, lighting of the LED lamp may be controlled.

The simulator 213 according to an embodiment of the present disclosure may receive a selection request regarding an IoT terminal, provision of a simulation service of which is planned, from the list of the IoT terminals, and may determine whether approval of an application corresponding to the received selection request has been made. That is, the simulator 213 provides the simulation service only when the application has been approved.

For example, when IoT terminals are components for realizing a smart office, approach to the IoT terminals should be selectively carried out. That is, the simulator 213 simulates such that only a user having a previously issued access right may approach to the IoT terminals. For example, the simulator 213 may determine whether approval of an application has been made, based on a public key corresponding to the IoT terminals.

The apparatus 210 may charge a predetermined fee according to provision of a simulation service. To accomplish this, the processing unit 211 may process a payment corresponding to the provided simulation service.

For example, the processing unit 211 may calculate a data communication amount between the IoT terminal and the user terminal or a data communication amount between the apparatus for providing a virtualization service platform and the user terminal as a fee. In addition, the processing unit 211 may charge a fee to be calculated to a content provider or a platform business operator. In another embodiment, the processing unit 211 may charge a fee considering a communication time, a communication frequency, etc. between corresponding entities.

Figure 3:
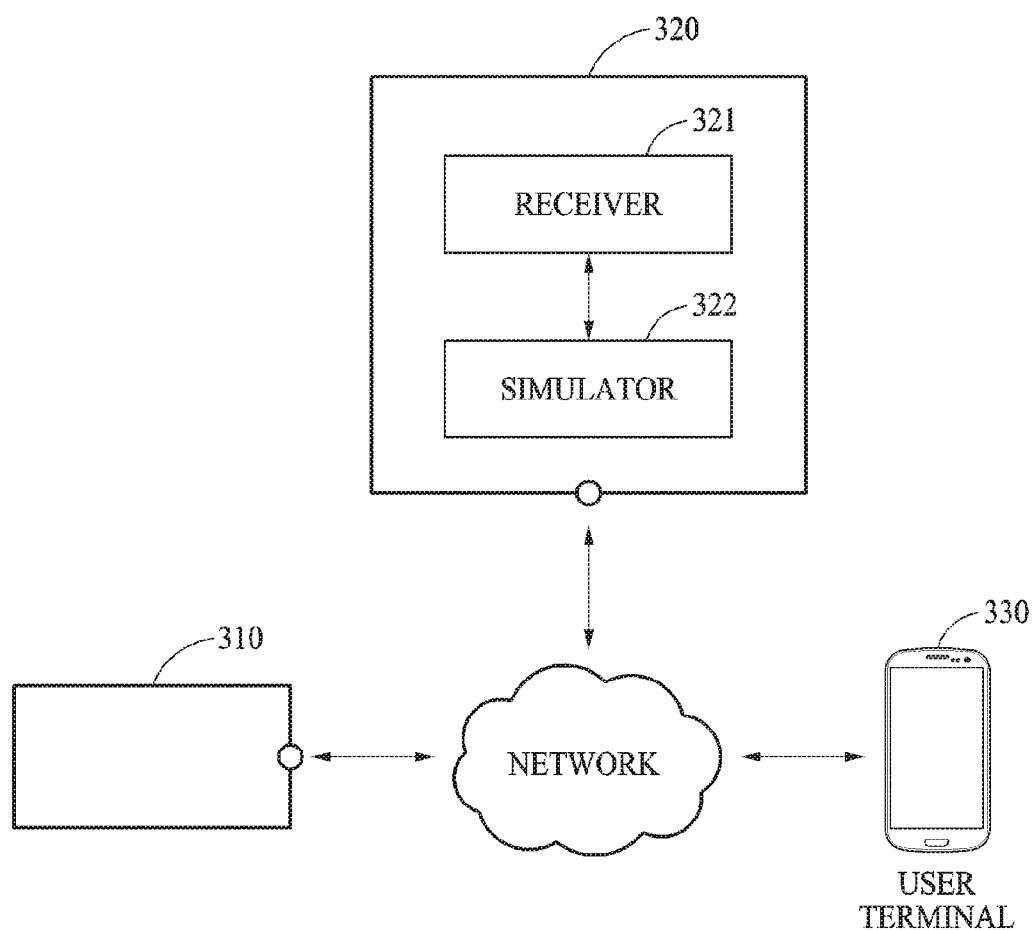
FIG. 3 illustrates a cloud server for providing a simulation service.

FIG. 3 illustrates a cloud server 320 for providing a simulation service.

In particular, the cloud server 320 may confirm identification information of an IoT terminal 330 transmitted from a set-top box 310. For example, the set-top box 310 stores a list of at least one IoT terminal and may identify a specific IoT terminal selected by a user via a user terminal 330. In addition, the set-top box 310 transmits identification information of the selected specific IoT terminal to the cloud server 320 and thus may request a simulation service of the selected specific IoT terminal.

In particular, the cloud server 320 includes a receiver 321 and the simulator 322 so as to provide a simulation service to the user terminal 330.

Accordingly, the receiver 321 according to an embodiment of the present disclosure receives a simulation service request of an IoT terminal selected from the IoT terminal list.

In addition, the simulator 322 extracts at least one virtualization object corresponding to the simulation service request and provides the same to the user terminal 330. For example, the simulator 322 may confirm instances included in the extracted at least one virtualization object, may collect content corresponding to the confirmed instances, and may provide the collected content to the user terminal 330.

The simulator 322 may store prior setting information set on at least one virtualization object by a user according to use of a simulation service. In this case, the stored setting information is applied to an IoT terminal to be purchased.

In addition, the simulator 322 may provide a simulation service by interworking the virtualization object with another IoT terminal. In addition, the simulator 322 may appropriate a fee considering a data communication amount between the IoT terminal and the user terminal 330 and may charge a fee based on the appropriated fee.

According to embodiments of the present disclosure, a simulation service is preferably provided separately from the IoT service, but the present invention is not limited thereto. That is, the IoT service provided by interworking with an IoT terminal may include a simulation service corresponding to the IoT terminal.

Accordingly, before purchase of the IoT terminal, a user may previously experience a use method, a manual, etc. of the IoT terminal to be purchased through the simulation service included in the IoT service, without confirmation of the use method, the manual, etc. through books or websites.

The IoT service according to an embodiment of the present disclosure may enable a simulated terminal to be recognized as a substantial IoT terminal. For example, when one virtualization terminal is added to a simulator, the IoT service according to an embodiment of the present disclosure may recognize and function as a case in which one IoT terminal is register/installed. In this case, a user may experience, before purchase of a device, an IoT service thereof.

Figure 4:
FIGS. 4 and 5 illustrate particular embodiments of a simulation service.
Figure 5:
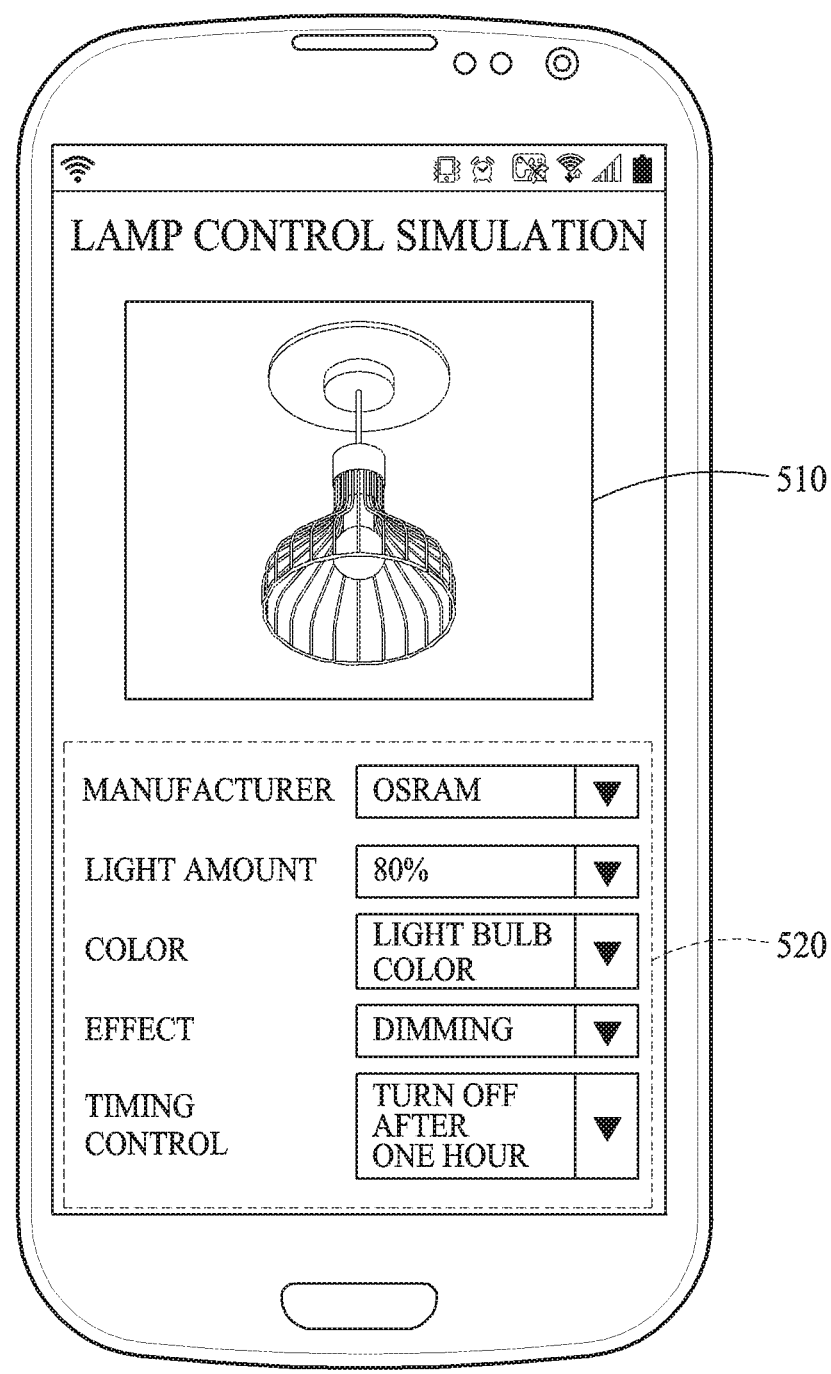

FIGS. 4 and 5 illustrate particular embodiments of a simulation service.

First, referring to FIG. 4, a user terminal 400 may display a list of IoT terminals, which are transmitted from an apparatus for providing a virtualization service platform, on a screen of the user terminal 400. The user terminal 400 may display "1. Television," "2. Lamp," "3. Refrigerator", "4. Gas range", "5. Water purifier", "6. Air conditioner", etc., as the list of IoT terminals. IoT terminals included in the list may be understood as devices including a smart control module in which wired/wireless local area communication or network communication is possible. In addition, IoT terminals included in the list are devices that are physically connected to an apparatus for providing a virtualization service platform or are recognized as being connected to the apparatus for providing a virtualization service platform based on identification information collected from the outside. Accordingly, regardless of installation, purchase, or launch of IoT terminals, the IoT terminals may be included in the list.

A user may select an IoT terminal, a simulation service of which is desired, from the displayed list.

FIG. 5 shows a case in which a user selects "2. Lamp" from the examples of FIG. 4.

Referring to FIG. 5, according to selection of a user, a simulation service for controlling the lamp is provided to a user terminal 500.

In an embodiment, the simulation service may be directly provided by an apparatus for providing a virtualization service platform or may be provided by a cloud server according to request of the apparatus.

The user terminal 500 displays a virtual lamp 510 and a control region 520 may input various control commands for controlling the virtual lamp 510.

Figure 6:
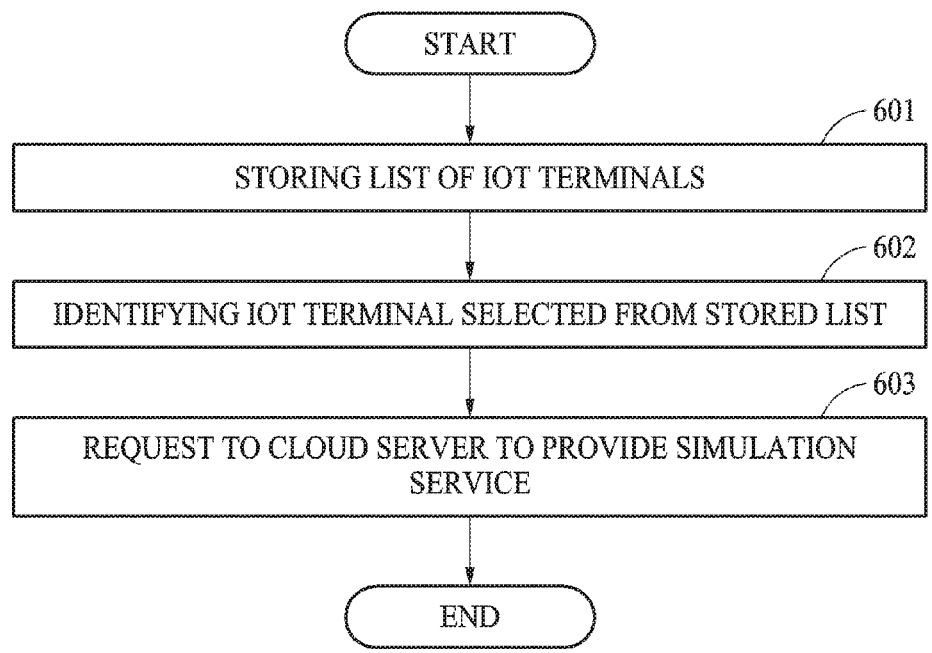
FIG. 6 is a flowchart illustrating a method of providing a virtualization service according to an embodiment of the present disclosure.

FIG. 6 is a flowchart illustrating a method of providing a virtualization service according to an embodiment of the present disclosure.

A method of providing a virtualization service according to an embodiment of the present disclosure may include storing a list of IoT terminals (step 601) and identifying the IoT terminals (step 602). In particular, the method may include identifying an IoT terminal selected from the list of the IoT terminals. Here, the IoT terminal list may be interpreted as a list of terminals that have been previously registered such that the terminals can be simulated, or are accessible. A user may select a simulation-desired specific IoT terminal from the user terminal list. In step 602, a selection value of a user is transmitted from a user terminal and may identify a selected IoT terminal from the IoT terminal list through information, such as touch coordinates, corresponding to the transmitted selection value.

Next, the method of providing a virtualization service according to an embodiment of the present disclosure may include requesting that a cloud server provides a simulation service corresponding to the identified IoT terminal (step 603).

Accordingly, the cloud server responds to the request and thus extracts at least one virtualization object. To accomplish this, the cloud server may maintain a virtualization object corresponding to each of IoT terminals included in the IoT terminal list or may collect a corresponding virtualization object from the outside.

The virtualization object may be interpreted as an assembly, etc. of various functions that may drive services supported by an IoT terminal and may be simulated through various instances including particular data according to driving of the IoT terminal.

Next, the cloud server may provide a simulation service using the extracted at least one virtualization object. To accomplish this, the cloud server confirms instances included in the extracted at least one virtualization object and collects content corresponding to the confirmed instances, thereby providing the collected content to the user terminal.

Therefore, the present invention allows a user to indirectly experience main functions of an IoT terminal regardless of launching of a complete product or purchase of the product and thus induces purchase. In addition, a user may directly experience the IoT terminal through a simulation, regardless of installation and without confirmation of a use method, a manual, etc. of the IoT terminal through a manual or a website, whereby determining the use of the IoT terminal or easily learning a method of using the same.

The method according to an embodiment of the present disclosure may be realized as a program command form that may be performed through various computer means and thus may be recorded in a medium that is readable by computers. Examples of the computer readable medium may exclusively include a program command, a data file, a date structure, or the like or may include a combination thereof. A program command recorded in the medium may be one specifically designed or constituted for the present invention or a publicly available one known to those skilled in the field of computer software. Examples of the computer-readable recording medium include magnetic media, such as a hard disk, a floppy disk, and a magnetic tape, optical media, such as CD-ROM and DVD, a magneto-optical media, such as a floptical disk, and hardware devices, such as ROM, RAM, and flash memory, specifically manufactured to store and perform a program command. Examples of the program command include high-level language code executed by a computer using interpreter, etc. as well as machine language code generated by a compiler. To execute the operations of the present invention, the hardware devices may be constituted to operate as one or more software modules, and vice versa.

In accordance with the embodiments of the present disclosure, purchase may be induced by allowing a user to indirectly experience main functions of an IoT terminal regardless of launching of a complete product or purchase of the product.

In accordance with embodiments of the present disclosure, use of a purchased IoT terminal may be determined by experiencing the IoT terminal through simulation or a use method thereof may be easily learned, regardless of installation.

Although the present invention has been described through limited examples and figures, the present invention is not intended to be limited to the examples. Those skilled in the art will appreciate that various modifications, additions and substitutions are possible, without departing from the scope and spirit of the invention.

It should be understood, however, that there is no intent to limit the invention to the embodiments disclosed, rather, the invention is to cover all modifications, equivalents, and alternatives falling within the spirit and scope of the invention as defined by the claims.

What is claimed is:

1. An apparatus for providing a virtualization service platform, comprising:
   a storage configured to store a list of Internet of Things (IoT) terminals;
   a non-transitory processor configured to,
      recognize a first IoT terminal and update the list by registering the first IoT terminal in the list if the first IoT terminal has been electrically connected to or installed,
      download terminal identification information on a second IoT terminal and unique identification information allowing unique identification of the second IoT terminal and update the list by registering the second IoT terminal based on the terminal identification information and the unique identification information if the second IoT terminal is a pre-release product, and
      collect identification information related to a third IoT terminal and update the list by registering the collected identification information if the third IoT terminal is a released product, but has not been purchased by a user, and
      identify a specific IoT terminal selected from the stored list of the IoT terminals; and
   a controller configured to cause a cloud server to provide a simulation service corresponding to the identified specific IoT terminal such that at least one virtualization object corresponding to the identified specific IoT terminal is provided to a user terminal,
   wherein the storage is further configured to store setting information that has been set in association with the at least one virtualization object by a user according to use of the simulation service, the controller is further configured to apply the setting information to the identified specific IoT terminal when the identified specific IoT terminal is purchased by the user,
the simulation service refers to a service that allows the user to indirectly experience functions of the identified specific IoT terminal,
the simulation service is further configured to (i) provide discount information considering an exposure time of advertising content to induce purchase of the identified specific IoT terminal, (ii) collect feedback information on the identified specific IoT terminal purchased through the simulation service, and (iii) determine whether approval of an application has been made, based on a public key corresponding to the IoT terminals, and
the non-transitory processor is further configured to,
process a fee corresponding to the provided simulation service by calculating the fee considering a data communication amount between the identified specific IoT terminal and the user terminal, and
charge the calculated fee to a content provider.

2. The apparatus according to claim 1, wherein the controller is further configured to cause the cloud server to confirm instances in the at least one virtualization object, collect content corresponding to the confirmed instances, and provide the collected content to the user terminal.

3. An apparatus for providing a virtualization service platform, comprising:
a non-transitory processor configured to,
recognize a first IoT terminal and update a list of Internet of Things (IoT) terminals by registering the first IoT terminal in the list if the first IoT terminal has been electrically connected to or installed,
download terminal identification information on a second IoT terminal and unique identification information of the second IoT terminal from outside and update the list by registering the second IoT terminal based on the terminal identification information and the unique identification information in the list if the second IoT terminal is a pre-release product,
collect identification information related to a third IoT terminal from the outside and update the list by registering the collected identification information in the list if the third IoT terminal is a released product, but has not been purchased by a user, and
identify a specific Internet of Things (IoT) terminal selected from the list of IoT terminals;
a controller configured to extract at least one virtualization object regarding the identified specific IoT terminal; and
a simulator configured to provide a simulation service to a user terminal using the extracted at least one virtualization object,
wherein the simulator is further configured to store setting information that has been set on the extracted at least one virtualization object regarding the identified specific IoT terminal by the user according to use of the simulation service,
the controller is further configured to apply the setting information to the identified specific IoT terminal when the identified specific IoT terminal is purchased,
the simulation service refers to a service that allows the user to indirectly experience functions of the identified specific IoT terminals,
the simulator is further configured to (i) provide discount information considering an exposure time of advertising content to induce purchase of the identified specific IoT terminal, (ii) collect feedback information on the identified specific IoT terminal purchased through the simulation service, and (iii) determine whether approval of an application has been made, based on a public key corresponding to the IoT terminals, and
the non-transitory processor is further configured to,
process a fee corresponding to the provided simulation service by calculating the fee considering a data communication amount between the identified specific IoT terminal and the user terminal, and
charge the calculated fee to a content provider.

4. The apparatus according to claim 3, further comprising:
a storage configured record specific identification information of the identified specific IoT terminal in relation to the at least one virtualization object corresponding to the specific identification information,
wherein the controller is configured to extract the at least one virtualization object using the specific identification information of the identified specific IoT terminal.

5. The apparatus according to claim 3, wherein the simulator is further configured to confirm instances in the extracted at least one virtualization object, collect content corresponding to the confirmed instances, and provide the collected content to the user terminal.

6. The apparatus according to claim 3, wherein the simulator is further configured to provide the simulation service in response to an operation of a virtualization object in another IoT terminal selected from the IoT terminals included in the list.

7. The apparatus according to claim 3, wherein the simulator is further configured to receive a selection request regarding the identified specific IoT terminal, and provide the simulation service in response to the approval of the application corresponding to the received selection request.

8. A method of providing a virtualization service, the method comprising:
recognizing, by a non-transitory processor, a first IoT terminal and updating a list of Internet of Things (IoT) terminals by registering the first IoT terminal in the list in response to the first IoT terminal having been electrically connected to or installed;
downloading, by the non-transitory processor, terminal identification information on a second IoT terminal and unique identification information of the second IoT terminal from outside and updating the list by registering the second IoT terminal based on the terminal identification information and the unique identification information in the list in response to the second IoT terminal being a pre-release product;
collecting, by the non-transitory processor, identification information related to a third IoT terminal from the outside and updating the list by registering the collected identification information in the list in response to the third IoT terminal being a released product, but having not been purchased by a user;
identifying, by the non-transitory processor a specific IoT terminal, which is selected from a list of stored IoT terminals;
causing a cloud server to provide a simulation service corresponding to the identified specific IoT terminal, by a controller such that at least one virtualization object corresponding to the identified specific IoT terminal is provided to a user terminal;
storing setting information that has been set in association with the at least one virtualization object by a user according to use of the simulation service; and applying the setting information to the identified specific IoT terminal when the identified specific IoT terminal is purchased by the user, wherein the simulation service refers to a service that allows the user to indirectly experience functions of the identified specific IoT terminal, wherein the causing includes causing the cloud server to provide the simulation service that is configured to (i) provide discount information considering an exposure time of advertising content to induce purchase of the identified specific IoT terminal, (ii) collect feedback information on an IoT terminal purchased, and (iii) determine whether approval of an application has been made, based on a public key corresponding to the IoT terminals, and the method further includes, processing, by the non-transitory processor, a fee corresponding to the provided simulation service by calculating the fee considering a data communication amount between the identified specific IoT terminal and the user terminal, and charging, by the non-transitory processor, the calculated fee to a content provider.

\* \* \* \* \*